Fig. 1,
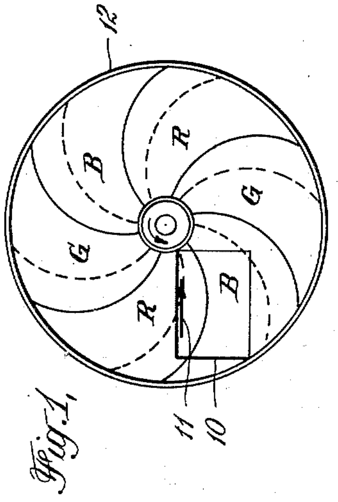
Fig. 2,
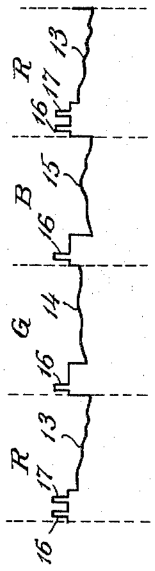
Fig. 3,
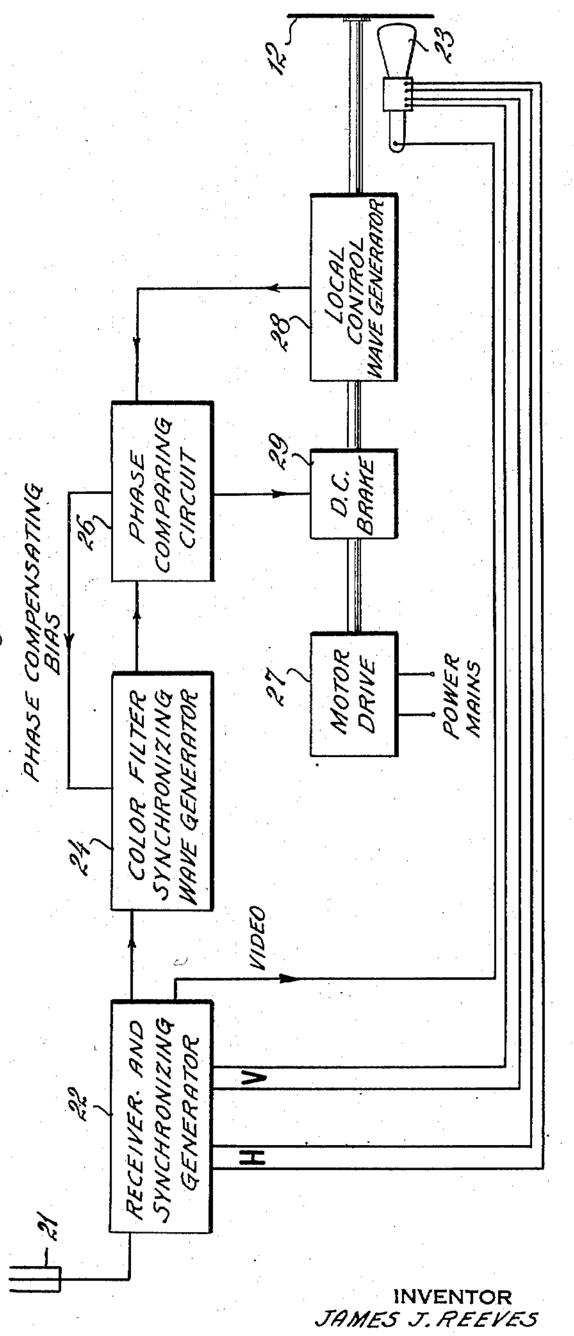
INVENTOR
JAMES J. REEVES
BY
Pennie, Edmonds, Morton + Barrows
ATTORNEYS Jan. 16, 1951 J. J. REEVES 2,538,041

COLOR TELEVISION

Filed April 30, 1946 3 Sheets-Sheet 2

INVENTOR
JAMES J. REEVES
BY Pennie, Edmonds, Morton & Barrows
ATTORNEYS

INVENTOR
JAMES J. REEVES
BY
Pennie, Edmonds, Morton & Barrows
ATTORNEYS

Patented Jan. 16, 1951

2,538,041

UNITED STATES PATENT OFFICE 2,538,041

COLOR TELEVISION

James J. Reeves, New York, N. Y., assignor to Columbia Broadcasting System, Inc., New York, N. Y., a corporation of New York Application April 30, 1946, Serial No. 665,925

16 Claims. (Cl. 178—5.4)

This invention relates primarily to color television, particularly to color television apparatus employing a moving filter element. In its broader aspects, however, it can be used in other fields. In the field of color television, while especially designed and adapted for use in receivers, it can also be applied to transmitters.

The color television system preferred at the present time is of the sequential type, wherein different primary colors of an object field are successively transmitted and reproduced. At the transmitter, an object field is successively scanned for different primary colors to produce a video signal having successive portions representing different color-separation values. This video picture signal is transmitted along with suitable synchronizing signals in fixed time relationship therewith. The synchronizing signals will ordinarily contain portions for line and field synchronization, and may contain distinctive portions for color synchronization. At the receiver the different color-separation values represented by the video signal are successively reproduced and exhibited in their respective colors.

Three primary colors are almost universally employed at the present time, to secure adequate color fidelity. Commonly, successive field scansions correspond to different primary colors and interlaced scansion is preferred. Such a system has been described in application Serial No. 355,840, filed September 7, 1940, now Patent No. 2,480,571, by Peter C. Goldmark, and has been found satisfactory in practice. A given interlaced field scansion could have portions of different color, but this is not considered practicable nor necessary at the present time.

In apparatus at present employed, a moving filter element, such as a rotating disk, drum or similar element, is commonly utilized at the transmitter in cooperation with the scanning device to present different color-separation values successively thereto. At the receiver a similar filter element is employed, usually in cooperation with a cathode-ray receiver tube, to exhibit successive color-separation images in their respective colors. By analogy to the color photographic art, the term "color-separation image" refers to a monochrome image, usually black and white, representing a primary color. Such an image may be that of the complete object field to be reproduced, or only a portion thereof.

For proper operation it is necessary that the rotating filter element be in synchronism and correct phase with the transmitting or receiving scanning device employed. Viewing the system as a whole, both transmitting and receiving filter elements must rotate in synchronism and proper phase.

Referring to the receiver for convenience, it is necessary not only for the filter element to rotate in synchronism with the reproduction of successive color-separation images, but also that it be phased with respect to the images so that, say, the red color-separation image will be displayed through the red filter, the green color-separation image through the green filter, etc. This may be termed "color phasing." An additional requirement is that the filter segments be properly phased with respect to the line-by-line reproduction of corresponding images, so that as successive lines are reproduced they will be exhibited through the proper color filter. If there is any afterglow or storage effect in the image reproduction, the filter segments must be sufficiently wide and properly phased so that proper color rendition is obtained. This may be termed "color field phasing" of the disk. At the transmitter comparable phase relationships must exist between the filter element and the scanning.

Patents Nos. 2,329,194 and 2,323,905, to Goldmark, disclose various methods and apparatus for synchronizing and phasing a rotating color filter with respect to a scanning device. Patent No. 2,319,789 to Chambers discloses a similar system in which the color phasing is performed automatically.

In Patent No. 2,323,905 the color filter is driven somewhat over synchronous speed by a nonsynchronous motor. A local control wave is generated by the rotation of the filter and its phase compared with that of an incoming synchronizing signal in a phase-comparing circuit. The output of the phase-comparing circuit is supplied to a brake to control the speed of rotation of the filter so as to maintain it in proper synchronism. Other patents have disclosed different means for utilizing a difference in phase between a locally generated wave and an incoming synchronizing wave to effect synchronization.

In these various systems color field phasing of the rotating filter has been accomplished by mechanically adjusting the position of the filter element on its shaft, or by adjusting the position of the stator of the local generator, or by other mechanical means. Co-pending application Serial No. 634,464, filed December 12, 1945, now Patent No. 2,437,690, by Peter C. Goldmark, discloses means for performing this color field adjustment by a variable electrical circuit.

In these prior systems the nonsynchronous motor is commonly energized directly from the power mains so as to avoid generating large amounts of power electronically. Power line voltages vary from area to area, and often fluctuate considerably even at a given location. While the brake or other means provided for synchronization may be designed to take care of such variations and fluctuations to preserve synchronization, it is clear that the color field phase of the rotating filter with respect to the color-separation images must necessarily change. This is due to the fact that the reproduction of the color-separation images is in synchronism and definite phase with the incoming synchronizing signal, so that the change in phase of the local control signal with respect to the synchronizing signal required to provide proper operating current to the brake or other means results in a shift in phase between the filter element and the images. This may result in improper reproduction of colors over part of the image area, or may make either the lagging or leading edge of a given color filter segment visible to the observer.

In some systems previously described the synchronizing signal portions used for controlling the rotation of the filter element are at field scanning frequency and special means are required for color phasing. The present tendency is to utilize distinctive color synchronizing signal portions recurring at the frequency of a given color. This avoids the need of additional means for color phasing, but yields a lower synchronizing frequency and hence increases the difficulty of proper color field phasing.

It is a primary object of the present invention to provide means for automatically preventing or diminishing variations in the color field phase of the filter element with changes between the incoming synchronizing and local control signals. Thus changes in line voltage, or in the load on the shaft of the rotating filter, are automatically compensated.

In accordance with the invention, a change between the incoming synchronizing and locally generated control signals is caused to change a control output which controls the speed of movement of the color filter element, and means responsive to such change is provided to at least partially restore the initial relative relationship of the signals while preserving the required new value of control output. Generally the relative phase of the synchronizing and control signals is employed to produce the control output, and any change is caused to change the instantaneous values of one of the signals producing the control output. In the specific embodiment described hereinafter, a change in control output produces a bias which changes the phase of the incoming synchronizing signal as supplied to the circuit which produces the control output. By properly determining the amount and direction of the compensation, any changes between synchronizing and control signals required to maintain synchronism may take place without seriously changing the color field phase of the filter element.

The invention will be more fully understood by reference to the specific embodiment illustrated in the drawings and the following description thereof. In the drawings:

Fig. 1 illustrates proper and improper color field phasing;

Fig. 2 represents a sequential color video signal with field and distinctive color synchronizing signal portions;

Fig. 3 is a block diagram illustrating one form of the invention;

Figure 4:
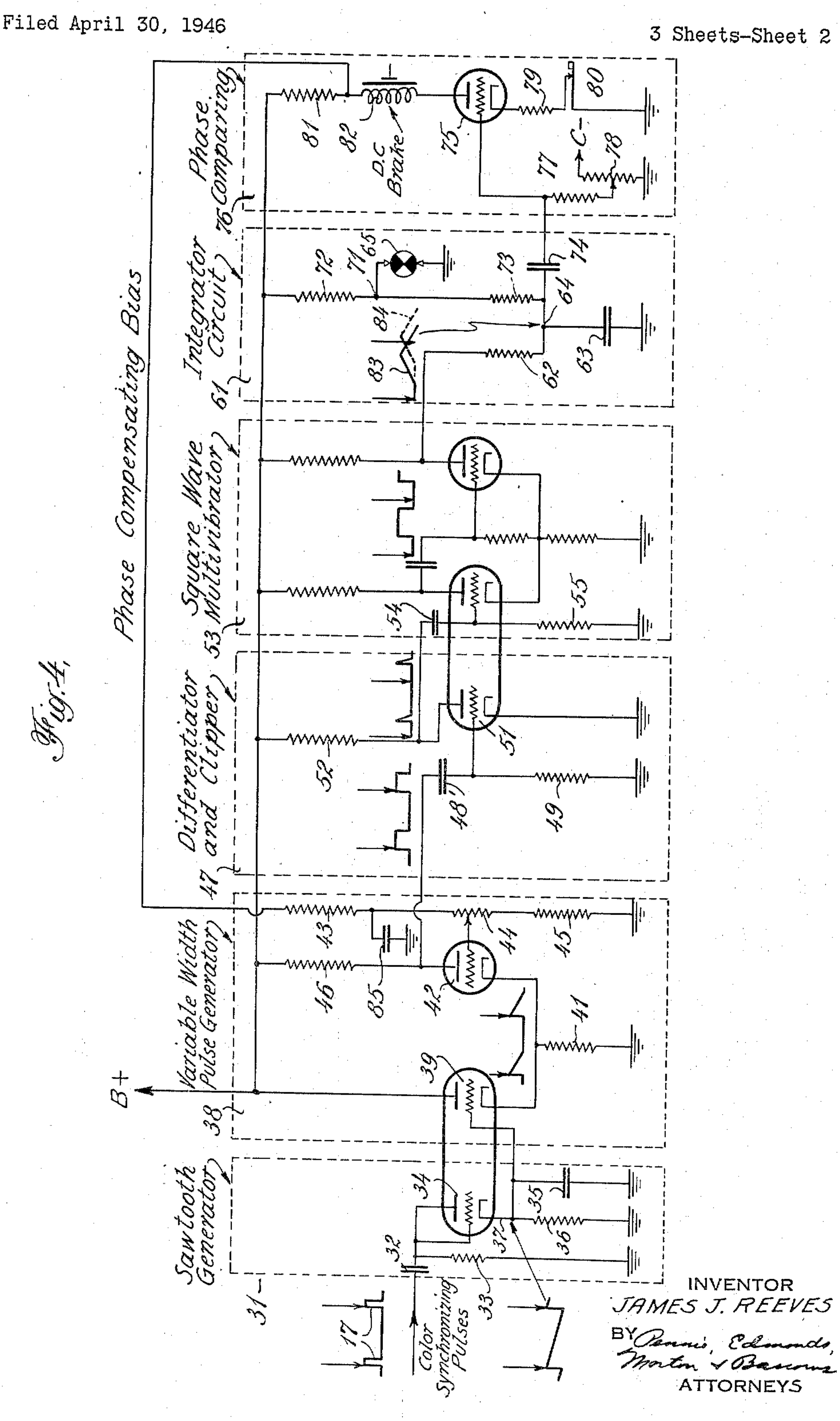
Fig. 4 is a circuit diagram of a specific embodiment of the invention.

Referring now to Fig. 1, the rectangle 10 represents the reproducing area of a receiver, such as the screen of a cathode-ray tube. Arrow 11 indicates the line being scanned at the instant illustrated. A scanning disk 12 with filters R, G, B rotates in front of the scanning area so as to exhibit successive color-separation images reproduced on the scanning area in their corresponding colors. The segments of filter disk 12 have the configuration described in Patent 2,304,081, to Goldmark, but any other type of disk may be employed as desired. The field scanning is assumed to proceed from top to bottom, and the disk to rotate counter-clockwise. It will be understood that a filter drum or other form of filter may be employed instead of a disk. These devices are sometimes called generically "color wheels."

In the position shown in full lines it will be observed that the red filter is phased slightly in advance of line 11 being scanned, and line 11 will be understood to correspond to the red aspect of the image to be reproduced. As scanning proceeds toward the bottom, the red filter will maintain its position slightly in advance so that the lines will be exhibited in the proper color as they are scanned, over the entire image area 10. The width and shape of segment R is such as to allow some afterglow of the scanning lines and still exhibit them through the red filter as long as they remain luminous. When the green color-separation image is beginning to be reproduced by scanning line 11, the green filter segment will be in proper position to exhibit the line therethrough. Thus proper color field phasing is attained.

While considerable latitude in phasing is available by the design of disk 12, the dotted position shows the disk in an improper color field phase relationship. If scanning line 11 is again assumed to represent a red aspect of the image, it will be observed that a portion of the line is being exhibited through the blue filter, since the red filter is lagging too much behind its proper position. Hence a mixture of blue and red colors will be obtained from line 11, assuming that some afterglow is present. Under stable conditions, this situation may be corrected by rotating filter disk 12 on its axis through the necessary angle, or by other means. However, under changing conditions the disk may sometimes be in correct, and sometimes incorrect, color field phase, so that this expedient is insufficient.

Referring now to Fig. 2, a color video signal of the sequential type is shown, having successive portions 13, 14 and 15 representing different color aspects or color-separation values of the object field, as indicated by the letters R (red), G (green), B (blue). Successive portions are assumed to represent successive field scansions which may be interlaced as mentioned hereinbefore. The video signal also has a synchronizing signal associated therewith in fixed time relationship. This signal includes pulses 16 provided for field synchronization. These need not be single pulses as shown, but may be of any desired form known in the art. While the field synchronizing pulses 16 may be used alone for color synchronization, Fig. 2 shows additional distinctive pulses 17 accompanying each red color field which may be used by themselves for color synchronization, or may be used in conjunction with the field synchronizing pulses 16 for color synchronization. Distinctive color pulses 17 need not be the simple pulses shown, but may be any distinctive signal pulses desired. The line synchronizing pulses of the synchronizing signal are not shown in Fig. 2 since it is impracticable.

Referring now to Fig. 3, a color video signal of the sequential type having a synchronizing signal therewith, like that of Fig. 2 or any other suitable type, is received by antenna 21 and supplied to the receiver and scanning synchronizing generator 22. In 22 the incoming signal is amplified and detected, and the video supplied to the control grid of cathode-ray tube 23. The line and field synchronizing pulses of the synchronizing signal are employed to control the generation of horizontal (H) and vertical (V) sawtooth scanning waves which are supplied to the deflecting coils or plates of the cathode-ray tube. Thus the reproduction of the color-separation images will be in synchronism and bear a definite phase relationship with the synchronizing signal.

Either the field synchronizing pulses, or distinctive color synchronizing pulses, or both, may be supplied from 22 to the color filter synchronizing wave generator 24. In the following detailed discussion it will be assumed that distinctive color synchronizing pulses recurring at the frequency of a given color are supplied to 24. Modifications required in the event that the other synchronizing signals are supplied will be apparent to those in the art.

In 24 the color synchronizing pulses are employed to control the generation of a derived color filter synchronizing signal of any suitable wave form. Triangular waves are specifically described herein but other wave shapes may be employed as mentioned hereinbefore. Generator 24 contains suitable circuits for controlling the phase displacement angle of the channel and thereby controlling the phase of the output derived synchronizing signal with respect to the incoming synchronizing signal. The output signal is supplied to the phase-comparing circuit 26. It will be understood that broadly the synchronizing signal from receiver 22 may be considered as supplied to the phase-comparing circuit 26, even though its wave form and phase may be considerably changed in generator 24.

Color filter disk 12 is driven by a nonsynchronous motor 27 energized from a suitable source of power here shown as the power mains. On the same shaft is a generator 28 which generates a local control wave or signal whose frequency varies with the speed of rotation of the color filter disk 12, and is preferably equal to that of the derived synchronizing signal when the disk is rotating at synchronous speed. The wave form of the local control signal may advantageously be made similar to that of the derived synchronizing signal, and this may be accomplished by proper design of the pole pieces or by the use of suitable circuits associated with the generator.

The output of the local control wave generator 28 is supplied to the phase-comparing circuit 26 whose output varies with changes in the relative phase of the local control signal and the synchronizing signal supplied thereto. The output of phase-comparing circuit 26 is supplied to the D.-C. brake 29 which thereby controls the speed of rotation of the filter disk 12. Motor 27 normally tends to drive the disk over synchronous speed so that a certain amount of current normally flows through brake 29 to maintain synchronous speed. Then, if for any reason, such as an increase in the power mains voltage, motor 27 tends to drive the filter disk faster, the output of the phase-comparing circuit 26 will increase and increase the braking action. An opposite result follows from any factors which tend to decrease the speed of the disk.

Since a given value of current in the brake requires a given relative phase of the synchronizing signal and local control signal supplied to the phase-comparing circuit 26, disk 12 should be positioned on its shaft so that it is in proper phase relationship with the images reproduced on tube 23 for the normal brake current. However if, due to changes in the power mains voltage or other factors, different values of brake current are required to maintain sychronization, a different relative phase relationship of synchronizing and local control signals will result. Inasmuch as the local generator 28 is fixed with respect to filter disk 12 and the image reproduction on tube 23 is in definite phase with respect to the incoming synchronizing signal, the phase of disk 12 would change with respect to the images for the operation as so far described. This has been termed herein as a change in the color field phasing of the filter disk 12.

To prevent or diminish such variations in the color field phase of the filter disk, a phase-compensating bias is derived from the control output of the phase-comparing circuit 26 and fed back to generator 24 so as to shift the amplitude-time characteristic and thereby change the instantaneous values of the derived synchronizing signal with respect to those of the incoming synchronizing signal, as by shifting its phase. If the bias is applied so as to shift the phase displacement angle of the channel in the proper direction, any change in the brake current is accompanied by a change in the phase of the derived synchronizing signal so as to reduce the change in color field phase of the rotating disk.

It may be considered that a change in phase of the local control signal with respect to the incoming synchronizing signal results in a change in phase of the derived synchronizing signal which restores the original phase of the local control signal, and hence the color field phase of the disk, while at the same time preserving the new relative phase of the derived synchronizing and local control signals required to produce the necessary braking action. Generally the bias produced by a given change in control output alters one of the signals producing the output in a direction tending to augment the given change. The final change in output is such as to maintain disk synchronization under the new conditions, but the variation in color field phase of the disk is diminished.

The wave forms of the synchronizing signal and the local control signal as supplied to the circuit for producing the control output may vary widely, depending on the type of circuit selected and the range and smoothness of control desired. Triangular and sawtooth waves are suitable for smooth control in the type of phase-comparing circuit described herein, but many other wave forms are possible. Also, while both signals are advantageously similar in shape in the type of phase-comparing circuit here described, they may be of dissimilar shape if desired, and circuits may be suitably designed to employ such dissimilar wave forms.

Referring now to Fig. 4, a specific circuit is shown for carrying out the invention. Color synchronizing pulses 17 (Fig. 5*a*) are supplied to the input of sawtooth generator 31 through a coupling capacitor-resistor combination 32, 33. The sawtooth generator comprises a triode section 34 connected as a diode, having in its cathode circuit capacitor 35 and resistor 36. During a pulse, capacitor 35 is quickly charged through the diode and, after the pulse has passed, the charge is dissipated more slowly through resistor 36. If the time constant of 35 and 36 is properly selected, a reasonably good sawtooth wave may be obtained at the cathode lead 37 as indicated in Fig. 5*b*. The wave forms are also shown in Fig. 4 and two arrows represent the instants at which two successive pulses begin.

The sawtooth wave is supplied to the input of a variable width pulse generator 38, the input being to the grid of triode 39. Resistor 41 supplies cathode bias for triode 39 and is also in the cathode circuit of triode 42. Thus by varying the grid bias of tube 42, and hence the cathode current, the cathode bias for tube 39 can be varied. Normally the value of bias for tube 39 is such as to clip the sawtooth supplied thereto, to a greater or lesser degree, as indicated in Fig. 5*c*. The more positive portions of the sawtooth waves are reproduced, but the less positive portions are beyond cutoff and hence clipped, the degree of clipping being under the control of the grid bias of tube 42.

The clipped sawtooth waves are supplied to the cathode of tube 42 through the common cathode connection. D.-C. grid bias is supplied from the B+ source through plate resistor 81 in the phase-comparing circuit, thence through resistor 43, potentiometer 44 and resistor 45. This D.-C. bias may be altered as desired by changing the setting of potentiometer 44. In addition to the D.-C. bias, a phase-compensating bias is supplied from the phase-comparing circuit as will be described hereinafter. Plate voltage for tubes 39 and 42 is supplied from a B+ source, the latter through plate resistor 46.

The amplification of tube 42 is sufficiently high so that the clipped sawtooth waves applied to the cathode appear as substantially rectangular pulses at the plate (Fig. 5*d*). The width of these pulses depends upon the width of the clipped sawtooth waves, which in turn depends upon the grid bias of tube 42.

The positive pulse output of 42 is supplied to the differentiator and clipper circuit 47. Capacitor 48 and resistor 49 have a time constant short compared to the length of the pulses supplied thereto, hence forming a differentiating circuit. When a pulse is applied to the circuit a positive peak is produced by the leading edge and a negative peak by the trailing edge, as shown in Fig. 5*e*. These differentiated pulses are applied to the grid of triode 51, which is normally at or near cathode potential. Hence the positive peaks applied to the grid are substantially clipped, whereas the negative peaks are amplified and produce short positive pulses or pips across the output resistance 52, as shown in Fig. 5*f*. The positive pips in the output are accordingly in phase with the trailing edge of the pulses supplied to the differentiating circuit.

The output pips are supplied to the square wave multivibrator 53 through the coupling capacitor-resistor combination 54, 55. The multivibrator is shown as a modified Schmitt type flip-flop circuit which gives a square wave output in synchronism with the applied trigger pips, as illustrated in Fig. 5*g*. It will be observed that the phase of the square wave is determined by the phase of the trailing edge of the variable width pulses of Fig. 5*d*, which in turn is controlled by the bias supplied to tube 42.

The square wave output is supplied to the integrator circuit 61. Resistor 62 and capacitor 63 have a time constant selected to integrate the square wave input into a substantially triangular wave at the midpoint 64, as shown in Fig. 5*h*. This triangular wave will have a definite phase relationship with the input square wave.

Figure 6:
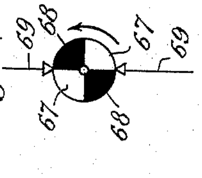
Fig. 6 is a diagrammatic representation of a shaft commutator employed in generating the local control signal.

On the shaft of the filter disk is a commutator 65 shown on an enlarged scale in Fig. 6. The commutator contains alternate conductive segments 67 and nonconductive segments 68 which cooperate with brushes 69 to alternately ground and unground terminal 71 of resistor 72 (Fig. 4). The opposite end of resistor 72 is connected to the B+ supply so that, in effect, a square wave is generated and impressed on the resistor 73 in series with capacitor 63. Resistor 73 and capacitor 63 likewise form an integrating circuit which integrates the impressed square wave into a substantially triangular wave as shown in Fig. 5*i*. If it is assumed that color fields are reproduced at a frequency of 120 fields per second and that the distinctive color pulses recur at 40 cycles per second, the triangular wave of Fig. 5*h* will have a frequency of 40 cycles per second. If the color disk has six filter segments as shown in Fig. 1, it should be rotated at 20 revolutions per second and the commutator of Fig. 6 will thus yield a square wave of 40 cycles per second. When integrated, the triangular wave of Fig. 5*i* will have the same frequency as that of 5*h*.

Since capacitor 63 is common to the two integrating circuits, both triangular waves will appear at the junction 64. The two waves are then supplied through coupling capacitor 74 to the grid of tube 75 in the phase-comparing circuit 76. Resistor 77 is a suitable coupling resistor with one terminal connected to potentiometer 78 which furnishes an appropriate value of grid bias which may be varied to regulate the characteristics of the tube. Tube 75 is provided with a cathode resistor 79 whose value may be selected to yield a desired amount of degeneration in the phase-comparing circuit and to adjust the characteristics of the tube. Also in circuit is a jack 80 for measuring the current through the circuit.

In the plate circuit is plate resistor 81 and the actuating coil 82 of the D.-C. brake 29 (Fig. 3), which is mounted on the shaft of the filter disk. The brake is operated by the output of the phase-comparing circuit, and this output varies with the phase of the two waves supplied to the grid. As the waves move into phase the output increases to provide more braking action, and as the waves move out of phase the output decreases to provide less braking action. This operation has been described in detail in Patent No. 2,323,905 to Goldmark and will not be repeated here.

As explained before, as the relative phase of the synchronizing signal 83 and the local control signal 84 changes, the color field phase of the filter disk tends to change. This is compensated in the circuit of Fig. 4 by developing a phase-compensating bias across resistor 81 which is proportional to the output of the phase-comparing stage, and hence varies with changes in the relative phase of the input signals. The phase-compensating bias is fed back through resistor 43 to the grid of tube 42. Capacitor 85 is provided for filtering. Additional filtering may of course be employed to prevent any A.-C. ripple from reaching the grid of tube 42.

As will be apparent from the foregoing discussion, the change in grid bias of 42 changes the cutoff value of tube 39, thereby changing the width of the pulse output of stage 38, hence the phase of the trigger pips of stage 47, the phase of the square wave of stage 53, and finally the phase of triangular wave 83 supplied to the phase-comparing circuit. In effect, the phase displacement angle of the channel through which the incoming synchronizing signal is supplied to the control (phase-comparing) circuit is changed by the phase-compensating bias. As a result, the phase of the synchronizing signal as supplied to the control circuit is changed with respect to the incoming synchronizing signal, and hence with respect to the synchronized reproduction of the color-separation images. The operation is automatic and will provide satisfactory color field phase compensation provided the circuit constants are properly selected.

Figure 5:
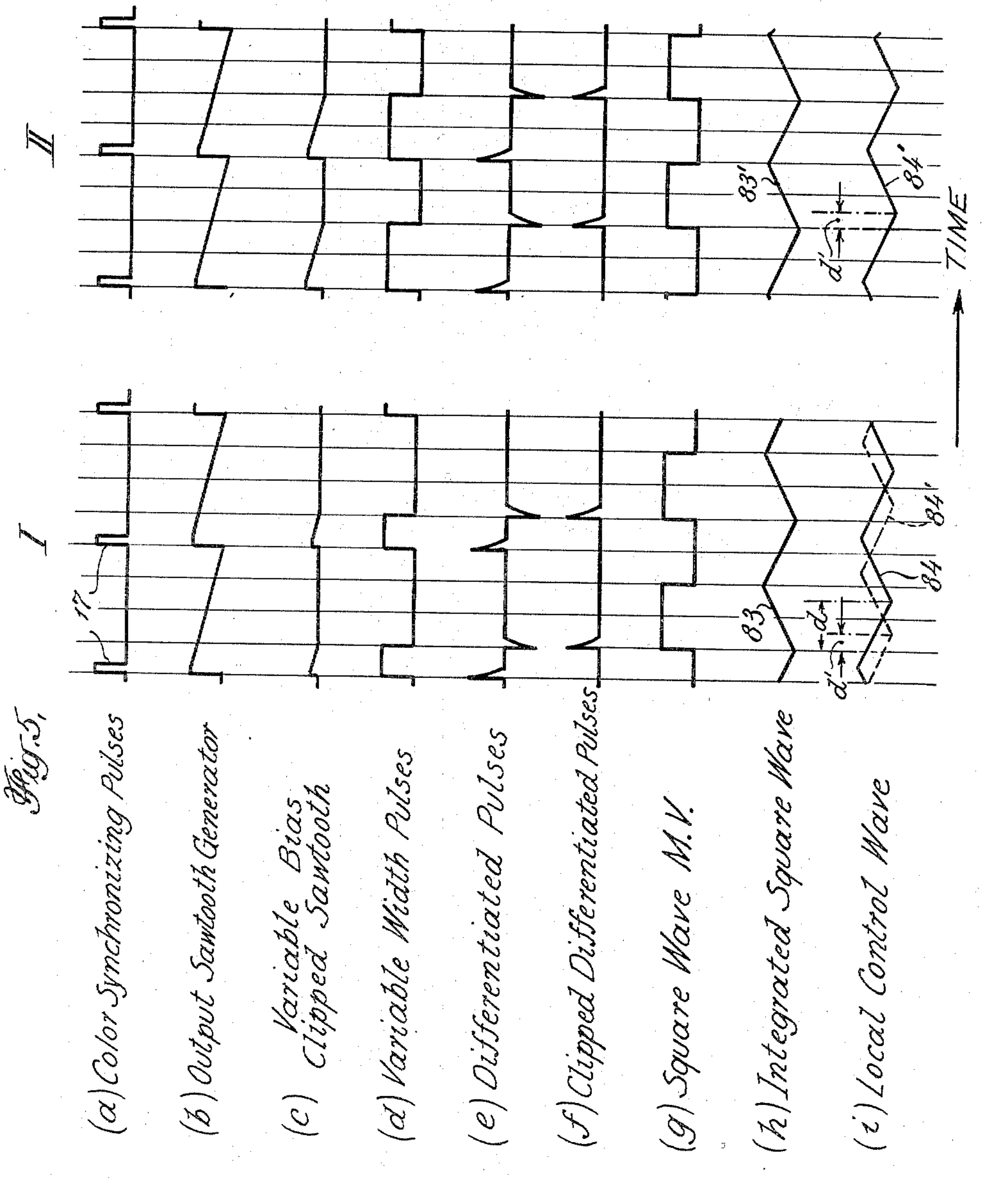
Fig. 5 shows wave forms of the circuit of Fig. 4 under two different conditions.

The operation may be more fully understood by referring to Fig. 5. Column I represents the wave forms for a given amount of phase-compensating bias which clips the sawtooth as shown in 5*c*. It is assumed that the power line voltage and the circuit constants are such that a relative phase *d* between the synchronizing signal 83 (Fig. 5*h*) and the local control signal 84 (Fig. 5*i*) is required to produce the proper amount of brake current to maintain synchronism. It is further assumed that the position of the commutator 65 and filter disk 12 on the shaft yields the proper color field phase with respect to successive color-separation images on tube 23 (Fig. 3), which are in synchronism with the synchronizing pulses of Fig. 5*a*. This may be assumed to be the normal condition.

If now the power mains voltage increases, tending to drive the disk faster, the local control wave 84 will tend to move into phase with synchronizing wave 83 so as to provide more brake current. In the absence of the phase-compensating bias, the control wave would assume the dotted line position 84′ of Fig. 5*i*, thereby reducing the angle of lag to *d*′. This is corrected by the phase-compensating bias as shown in column II.

In column II the voltage drop in resistor 81 is assumed to have increased due to the additional current flowing in the brake, so that the grid bias of tube 42 is more negative. Thus the cathode bias will be decreased, and the clipped sawtooth of Fig. 5*c* is longer in column II. The variable width pulses are therefore longer and the clipped differentiated pulses lag more than before. Hence the square wave and integrated triangular wave will lag into the position shown in Fig. 5*h*, column II. Since the relative phase of the local control signal 84′ (Fig. 5*i*) to the synchronizing signal 83′ must be *d*′ in order to provide the necessary brake current, the phase relationships will be as shown in column II.

It will be observed that the phase of wave 84′ in column II with respect to the incoming synchronizing pulses (Fig. 5*a*) is the same as that of wave 84 in column I. Since the color-separation images are in synchronism and fixed phase with the color synchronizing pulses, the local control wave phase and hence the color field phase of the filter disk is the same in both columns. This is the desired result.

It will also be observed that since the phase-compensating bias causes the synchronizing signal of Fig. 5*h*, column II, to lag its original position, hence tending to come more into phase with the local control signal of Fig. 5*i*, the control output of the phase-comparing circuit tends to increase. The bias, however, was produced by an increase in control output. Hence the change in output produced by the bias tends to augment the initial change. The final relative phase is determined by the output required to maintain synchronization, indicated as *d*′, so that the local control signal (and hence the color disk) automatically follows the synchronizing signal by the phase angle *d*′.

If the voltage to the nonsynchronous motor should decrease, the phase-compensating bias will become more positive, thus shifting the triangular wave in Fig. 5*h* to the left rather than to the right. This again will be found to restore the correct color field phase of the disk.

Instead of shifting the phase of the synchronizing signal as supplied to the phase-comparing circuit, the phase-compensating bias could be used to shift the phase of the local control signal. For example, the color synchronizing pulses or a synchronizing signal derived therefrom may be supplied directly to the phase-comparing circuit 76, and short local control pulses may be generated and supplied to the sawtooth generator 31. In such an event the phase would need to be shifted in the opposite direction, and this may easily be accomplished by taking the bias from the cathode of tube 75 and supplying this to tube 42, since the cathode voltage of tube 75 will vary in the opposite direction to that of the anode connection shown. Additional filtering to insure that the phase-compensating bias is free from A.-C. ripple may be employed as desired.

In Fig. 4 resistor 43 may be varied to change the amount of automatic phase correction. Over or under compensation may be obtained by adjusting resistor 43, or by adjusting resistor 81, or the grid potentiometer 44. If the voltage drop across the cathode resistor 79 of the phase-comparing circuit is used to provide the bias, as above discussed, this may be varied to produce over or under compensation rather than the plate resistor.

Since the ultimate end is to maintain the color field phase of the disk with respect to successive images on the cathode-ray tube, it would be possible to use the phase-compensating bias to change the phase of reproduction of the pictures. This would require considerably more elaborate circuitry, and might interfere with proper reproduction of the images, so it is preferred to apply the bias to either the synchronizing signal circuit or the local control signal circuit as above described.

It will be clearly apparent to those in the art that many different circuits may be devised for changing the phase of the incoming synchronizing signal or the local control signal in accordance with changes in the relative phase therebetween. The embodiment of Fig. 4 is given as an example of a circuit which has been successfully operated. In its broader aspects, however, the invention is not confined to the details of the circuits shown.

As examples of many possible variations, separate circuits responsive to change of relative phase of the local control and synchronizing signals could be employed to develop the phase-compensating bias. The speed of rotation of the filter may be controlled by means other than a brake. Other types of color video and synchronizing signals may be employed, some of which have been discussed hereinbefore. The circuits could be readily adapted to use the field synchronizing pulses for color filter synchronization. In such event jack 80 could be replaced by a push button for color phasing, or such color phasing performed automatically.

The invention may also be employed at the transmitter, as mentioned hereinbefore, to maintain the transmitter color filter in proper synchronism and phase with respect to the scanning at the transmitter tube.

These and other variations will be understood to be within the scope of the invention as defined in the claims.

I claim:

1. In a color television system employing a color video signal with a synchronizing signal associated therewith, apparatus comprising a scanning device, means for operating said scanning device substantially in synchronism with said synchronizing signal, a movable color filter element cooperating with said scanning device and a nonsynchronous driving motor coupled thereto, a generator actuated with said color filter element and adapted to produce a control signal, a phase-comparing control circuit supplied with said synchronizing and control signals and responsive to changes in relative phase therebetween to control the speed of movement of said color filter element, and a phase-shifting circuit responsive to a change in said relative phase to change the phase of one of said signals between the source thereof and said control circuit whereby variations in color field phase of the color filter element may be diminished.

2. In a color television system employing a color video signal with a synchronizing signal associated therewith, apparatus comprising a scanning device, means for operating said scanning device substantially in synchronism with said synchronizing signal, a rotatable color filter element cooperating with said scanning device with a nonsynchronous driving motor and a generator coupled thereto, said generator being adapted to produce a control signal of substantially fixed phase with respect to the rotation of the filter element, a phase-comparing circuit responsive to a change in relative phase of said synchronizing and control signals for producing a control output electric wave to control the speed of rotation of the color filter element, and a phase-shifting circuit responsive to a change in said control output electric wave to at least partially restore the initial relative phase of said signals, whereby variations in color field phase of the color filter element may be diminished.

3. In a color television system of the sequential type having a synchronizing signal in fixed time relationship with the video signal, apparatus comprising a scanning device, means for operating said scanning device substantially in synchronism with said synchronizing signal, a movable color filter element cooperating with said scanning device and a nonsynchronous driving motor coupled thereto, a generator coupled to said color filter element and adapted to produce a control signal, a phase-comparing control circuit responsive to the difference in phase of said synchronizing and control signals to control the speed of movement of said color filter element, and a phase-shifting circuit responsive to a change in phase between said scanning device and said color filter element to change the phase of one of said synchronizing and control signals as supplied to the phase-comparing control circuit with respect to the synchronized operation of the scanning device, whereby variations in color field phase of the color filter element may be diminished.

4. In a color television system of the sequential type having a synchronizing signal in fixed time relationship with the video signal, apparatus comprising a scanning device, means for operating said scanning device substantially in synchronism with said synchronizing signal, a rotatable color filter element cooperating with said scanning device and a nonsynchronous driving motor coupled thereto, a generator coupled to said color filter element and adapted to produce a control signal whose frequency varies with the speed of rotation thereof, a phase-comparing control circuit responsive to changes in the relative phase of said synchronizing and control signals to control the speed of rotation of said color filter element, and a phase-shifting circuit responsive to a change in said relative phase to change the phase of one of said signals between the source thereof and said phase-comparing control circuit, whereby variations of color field phase of the rotatable color filter element may be diminished.

5. In a color television system of the sequential type having a synchronizing signal in fixed time relationship with the video signal, apparatus comprising a scanning device, means for operating said scanning device substantially in synchronism with said synchronizing signal, a rotatable color filter element cooperating with said scanning device and a nonsynchronous driving motor coupled thereto, a generator coupled to said color filter element and adapted to produce a control signal whose frequency varies with the speed of rotation thereof, a phase-comparing circuit supplied with said synchronizing and control signals through respective channels and responsive to changes in relative phase therebetween to control the speed of rotation of the color filter element to maintain synchronization thereof, and a phase-shifting circuit responsive to a change in said relative phase to change the phase displacement angle of one of said channels in a direction to diminish change in color field phase of said color filter element.

6. In a color television system of the sequential type having a video signal with successive portions representing different color-separation values of an object field and a synchronizing signal in fixed time relationship therewith, apparatus comprising a cathode-ray scanning device, means for operating said scanning device substantially in synchronism with said synchronizing signal, a rotatable color wheel cooperating with said scanning device having a plurality of different color filters adapted to be rotated into operating position successively during the scanning of successive color-separation values, a nonsynchronous motor coupled to drive said color wheel, a generator coupled to said color wheel adapted to generate a control signal whose frequency varies with the speed of rotation thereof, a phase-comparing circuit responsive to changes in the relative phase of said synchronizing and control signals to control the speed of rotation of the color wheel to thereby synchronize the color filters with said scanning, and a phase-shifting circuit responsive to a change in said relative phase to change the phase of one of said signals between the source thereof and said phase-comparing circuit to thereby diminish change of color field phase of said color filters.

7. In a color television receiver utilizing a sequential color video signal with a synchronizing signal in fixed time relationship therewith, apparatus comprising means for reproducing successive color-separation images from said color video signal, a movable color filter element for presenting successive color-separation images in their respective colors and a nonsynchronous driving motor coupled thereto, a generator coupled to said color filter element adapted to produce a local control signal, a phase-comparing control circuit responsive to a change in relative phase of said synchronizing and control signals to control the speed of movement of said color filter element, and a feed-back circuit responsive to a change in phase between the reproduction of said color-separation images and the color filter element to shift the amplitude-time characteristic of one of said synchronizing and control signals between the source thereof and said phase-comparing control circuit in a direction tending to restore the initial phase.

8. In a color television receiver utilizing a sequential color video signal with a synchronizing signal in fixed time relationship therewith, apparatus comprising means for reproducing successive color-separation images from said color video signal, a movable color filter element for presenting successive color-separation images in their respective colors and a nonsynchronous driving motor coupled thereto, a generator coupled to said color filter element adapted to generate a local control signal whose frequency varies with the speed of movement thereof, a phase-comparing control circuit responsive to a change in relative phase of said synchronizing and control signals to control the speed of movement of said color filter element, and a phase-shifting circuit responsive to a change in relative phase of said synchronizing and control signals to change the phase of one of said signals as supplied to said phase-comparing control circuit with respect to the reproduction of said color-separation images.

9. In a color television receiver utilizing a sequential color video signal having successive portions representing different color-separation values of an object field and a synchronizing signal in fixed time relationship therewith, apparatus comprising a cathode-ray receiver tube, means for reproducing successive color-separation images from said color video signal with said tube substantially in synchronism with said synchronizing signal, a rotatable color filter element for presenting successive color-separation images in their respective colors and a nonsynchronous driving motor coupled thereto, a generator coupled to said color filter element adapted to generate a local control signal whose frequency varies with the speed of rotation thereof, a phase-comparing control circuit responsive to a change in relative phase of said synchronizing and control signals to control the speed of rotation of said color filter element and maintain synchronization thereof, and a phase-shifting circuit responsive to a change in relative phase of said synchronizing and control signals to change the phase of one of said signals as supplied to said phase-comparing control circuit with respect to the synchronized reproduction of said color-separation images, whereby variations of color field phase of said color filter element may be diminished.

10. In a color television receiver utilizing a sequential color video signal having successive portions representing different color-separation values of an object field and a synchronizing signal in fixed time relationship therewith, apparatus comprising a cathode-ray receiver tube, means for reproducing successive color-separation images from said color video signal with said tube substantially in synchronism with said synchronizing signal, a rotatable color filter element for presenting successive color-separation images in their respective colors and a nonsynchronous driving motor coupled thereto, a generator coupled to said color filter element adapted to generate a local control signal whose frequency varies with the speed of rotation thereof, wave-forming circuits for deriving from said synchronizing signal a derived synchronizing signal of wave form similar to said local control signal, a phase-comparing circuit supplied with said derived synchronizing and local control signals adapted to produce an output electric wave which varies with changes in relative phase of the signals, means utilizing said output electric wave for controlling the speed of rotation of the color filter element, and a phase-shifting circuit responsive to changes in the output electric wave of said phase-comparing circuit for automatically changing the phase of one of the signals supplied thereto with changes in said output, said phase-shifting circuit being in the path of said one signal between the source thereof and said phase-comparing circuit, whereby variations of color field phase of said color filter element may be diminished.

11. In a color television receiver utilizing a sequential color video signal having successive portions representing different color-separation values of an object field and a synchronizing signal in fixed time relationship therewith, apparatus comprising a cathode-ray receiver tube, means for reproducing successive color-separation images from said color video signal with said tube substantially in synchronism with said synchronizing signal, a rotatable color filter element for presenting successive color-separation images in their respective colors and a nonsynchronous driving motor coupled thereto, a generator coupled to said color filter element adapted to generate a local control signal whose frequency varies with the speed of rotation thereof, wave-forming circuits for deriving from said synchronizing signal a derived synchronizing signal of wave form similar to said local control signal, phase-shifting means in said wave-forming circuits for shifting the phase of the derived synchronizing signal, a phase-comparing circuit supplied with said derived synchronizing and local control signals adapted to produce an output which varies with changes in relative phase of the signals, means utilizing said output for controlling the speed of rotation of the color filter element, and connections from the output of said phase-comparing circuit to said phase-shifting means to automatically change the phase of the derived synchronizing signal with changes in said output to thereby diminish variations of color field phase of said color filter element.

12. In a color television receiver utilizing a sequential color video signal having successive portions representing different color-separation values of an object field and a synchronizing signal in fixed time relationship therewith, apparatus comprising a cathode-ray receiver tube, means for reproducing successive color-separation images from said color video signal with said tube substantially in synchronism with said synchronizing signal, a rotatable color filter element for presenting successive color-separation images in their respective colors and a nonsynchronous driving motor coupled thereto, pulse-forming circuits for deriving pulses from said synchronizing signal, phase-shifting means in said pulse-forming circuits for shifting the phase of the derived pulses, circuit means for producing a derived synchronizing signal under the control of said derived pulses, a generator coupled to said color filter element adapted to generate a local control signal of the frequency of said derived synchronizing signal when the filter rotates at synchronous speed and of similar wave form, a phase-comparing circuit supplied with said derived synchronizing and local control signals and adapted to produce an output which varies with changes in relative phase of the signals, means utilizing said output for controlling the rotation of the color filter element to thereby maintain synchronous speed, and connections from the output of said phase-comparing circuit to said phase-shifting means to automatically change the phase of said derived pulses with changes in said output to thereby diminish variations of color field phase of the color filter element.

13. In a color television receiver utilizing a sequential color video signal having successive portions representing different color-separation values of an object field and a synchronizing signal in fixed time relationship therewith, apparatus comprising a cathode-ray receiver tube, means for reproducing successive color-separation images from said color video signal with said tube substantially in synchronism with said synchronizing signal, a rotatable color filter element for presenting successive color-separation images in their respective colors, a nonsynchronous motor coupled to said color filter element and tending to drive the element over synchronous speed, pulse-forming circuits for deriving pulses from said synchronizing signal, phase-shifting means in said pulse-forming circuits for shifting the phase of the derived pulses, circuit means for producing a derived synchronizing signal under the control of said derived pulses, a generator coupled to said color filter element adapted to generate a local control signal of the frequency of said derived synchronizing signal when the filter rotates at synchronous speed and of similar wave form, a phase-comparing circuit supplied with said derived synchronizing and local control signals and adapted to produce an output which varies with changes in relative phase of the signals, a brake adapted to brake the rotation of the color filter element, means for controlling the operation of the brake in accordance with the output of the phase-comparing circuit to thereby maintain synchronous speed, and connections from the output of said phase-comparing circuit to said phase-shifting means to automatically change the phase of said derived pulses with changes in said output to thereby diminish variations of color field phase of the color filter element.

14. In a color television receiver utilizing a sequential color video signal having successive portions representing different color-separation values of an object field and a synchronizing signal in fixed time relationship therewith, apparatus comprising a cathode-ray receiver tube, means for reproducing successive color-separation images from said color video signal with said tube substantially in synchronism with said synchronizing signal, a rotatable color wheel for presenting successive color-separation images in their respective colors, a nonsynchronous motor coupled to said color wheel and tending to drive the wheel over synchronous speed, a sawtooth generator synchronized by said synchronizing signal, a pulse generator supplied from said generator and adapted to produce pulses of controllable width at the frequency of the sawtooth output, a differentiating circuit supplied from said pulse generator and adapted to produce short trigger pulses whose phase is controllable by the width of the aforesaid pulses, a generator and shaping circuits synchronized by said trigger pulses adapted to produce a derived synchronizing signal of substantially triangular wave form, a generator coupled to said color wheel adapted to generate a local control signal of the frequency of said derived synchronizing signal when the filter rotates at synchronous speed and of similar wave form, a phase-comparing circuit supplied with said derived synchronizing and local control signals and adapted to produce an output which varies with changes in relative phase of the signals, a brake adapted to brake the rotation of the color wheel, means for controlling the operation of the brake in accordance with the output of the phase-comparing circuit to thereby maintain synchronous speed, and connections from the output of said phase-comparing circuit to said pulse generator to automatically change the width of the pulses therefrom with changes in said output to thereby diminish variations of color field phase of the color wheel.

15. Apparatus for synchronizing a movable element with a synchronizing signal which comprises a nonsynchronous driving motor coupled to said movable element, a generator actuated with said movable element and adapted to produce a control signal whose frequency varies with the speed of movement thereof, a phase-comparing control circuit responsive to changes in relative phase between said synchronizing and control signals to produce an output electric wave which controls the speed of movement of said movable element to maintain synchronization thereof, and a phase-shifting circuit responsive to changes in said output electric wave to change the phase of one of the signals between the source thereof and said phase-comparing circuit in a direction to diminish variations in phase between said movable element and said synchronizing signal.

16. Apparatus for synchronizing a movable element with a synchronizing signal which comprises a non-synchronous driving motor coupled to said movable element, a generator actuated with said movable element and adapted to produce a control signal whose frequency varies with the speed of movement thereof, a phase-comparing circuit supplied with said synchronizing and control signals through respective channels and adapted to produce an output electric wave which varies with changes in relative phase of the signals, means utilizing said output electric wave for controlling the speed of movement of the movable element, a phase-shifting circuit in one of said channels to shift the phase of the signal passing therethrough, and connections from the output of said phase-comparing circuit to said phase-shifting circuit to produce an automatic phase shift with change in said output electric wave, whereby variations in phase between said movable element and said synchronizing signal may be diminished.

JAMES J. REEVES.

REFERENCES CITED

The following references are of record in the file of this patent:

UNITED STATES PATENTS

| Number | Name | Date |
|---|---|---|
| 2,141,343 | Campbell | Dec. 27, 1928 |
| 2,309,506 | Herbst | Jan. 26, 1943 |
| 2,309,622 | Anderson | Feb. 2, 1943 |
| 2,319,789 | Chambers | May 25, 1943 |
| 2,323,905 | Goldmark | July 13, 1943 |
| 2,329,194 | Goldmark | Sept. 14, 1943 |
| 2,350,008 | Artzt | May 30, 1944 |
| 2,352,541 | Harper | June 27, 1944 |
| 2,378,746 | Beers | June 19, 1945 |
| 2,383,360 | Artzt | Aug. 21, 1945 |
| 2,399,421 | Artzt | Apr. 30, 1946 |
| 2,428,946 | Somers | Oct. 14, 1947 |